United States Patent [19]

Boudreault et al.

[11] 4,182,589

[45] Jan. 8, 1980

[54] CORNER CHAMFERING MACHINE

[76] Inventors: Robert H. Boudreault, 17419 Farley Rd., Apt. 1, Los Gatos, Calif. 95030; Mark A. Boudreault, 837 Old Camden Ave.; Brenda L. Boudreault, 482 E Central Ave., both of Campbell, Calif. 95008

[21] Appl. No.: 924,987

[22] Filed: Jul. 17, 1978

[51] Int. Cl.[2] .................... B23C 1/025

[52] U.S. Cl. .................... 409/138; 51/102; 409/218; 409/226

[58] Field of Search .................... 90/18; 51/128, 102; 144/124, 253; 83/268

[56] References Cited

U.S. PATENT DOCUMENTS

| | | | |
|---|---|---|---|
| 596,429 | 12/1897 | Smith | 90/18 |
| 1,573,554 | 2/1926 | Knoll | 83/268 X |
| 1,834,075 | 12/1931 | Shambow | 90/18 |
| 2,204,945 | 6/1940 | Parker | 90/18 |
| 2,294,715 | 4/1942 | Bruno | 51/102 |
| 2,598,020 | 5/1952 | Rutherford | 51/102 |
| 2,621,547 | 12/1952 | Murchison | 90/18 |
| 3,125,934 | 3/1964 | Persson | 144/124 X |
| 3,160,069 | 12/1964 | Rogers | 90/8 |
| 3,209,800 | 10/1965 | Leibow | 90/18 |
| 3,834,274 | 9/1974 | Dowd | 90/18 X |

FOREIGN PATENT DOCUMENTS

| | | | |
|---|---|---|---|
| 668349 | 8/1963 | Canada | 51/102 |
| 421436 | 3/1974 | U.S.S.R. | 90/18 |

*Primary Examiner*—William R. Briggs

*Attorney, Agent, or Firm*—Claude A. S. Hamrick

[57] ABSTRACT

A chamfering apparatus for use in machining corner breaks of work pieces and including a base member establishing a horizontal support surface, a guide block mounted on the base member and forming a guide surface substantially normal to the horizontal support surface such that a trim slot is formed about he intersection of the plane of the horizontal support surface and the plane of the frontal vertical guide surface; a circular cutting member having an axis of rotation parallel with the axis of the trim slot positioned about the base member with the outer peripheral edge of the cutting member extending within the trim slot such that the edge of a work piece may be chamfered as it is moved along the trim slot while in abutting relationship to the horizontal support surface and frontal vertical guide surface.

9 Claims, 5 Drawing Figures

CORNER CHAMFERING MACHINE

BACKGROUND OF THE INVENTION

1. Field of the Invention

The present invention relates generally to chamfering machines and more particularly to a corner chamfering machine wherein the cutting member rotates about an axis parallel with the guide path of the work piece with vertical and horizontal support walls forming a trim slot within which the cutting member operates.

2. Discussion of the Prior Art

The prior art includes U.S. Pat. No. 3,691,898 granted to Kurt Held; U.S. Pat. No. 3,160,069 granted to J. E. Rogers; U.S. Pat. No. 1,676,336 granted to W. J. Knoll; U.S. Pat. No. 1,573,554 granted to W. J. Knoll; U.S. Pat. No. 596,429 granted to C. N. Smith; U.S. Pat. No. 598,227 granted to V. Royle; and U.S. Pat. No. 3,125,934 granted to T. Persson.

In machine tool operations on work pieces, it is desirable to have a machining apparatus which provides for fast, efficient, accurate operations and which are safe to the operator. With machine tools taught by the prior art, it is commonly necessary to clamp the work piece down to the machine tool itself prior to and during the machining operation. Also, it is commonly necessary to have feeding mechanisms so as to transport the work piece past the cutting tool.

SUMMARY OF THE INVENTION

It is an object of the present invention to provide a chamfering machine wherein the work piece may be rapidly fed past the cutting member without the need for clamping the work piece to the machine.

It is a further object of the present invention to provide a chamfering machine wherein the depth of the chamfer may be easily and accurately preset.

A further object of the present invention is to provide a chamfering machine wherein the cutting tools tends to pull the work piece against one of the support surfaces of the machine.

A further object of the present invention is to provide a chamfering machine which is economical to construct and operate.

Briefly, the preferred embodiment includes a base member establishing a horizontal support surface along a horizontal plane and with a longitudinal slot extending through said horizontal support surface; a guide block mounted on the base member and having a frontal vertical guide surface in a plane normal to the horizontal plane to form a trim slot about the intersection of said two planes. A circular cutting member is mounted about an axis of rotation parallel with the trim slot with the peripheral surface extending through the longitudinal slot and within the trim slot. Adjustment means are provided for adjusting the location of the guide block along orthogonal planes so as to adjust the size of the trim slot in turn, adjusting the degree of chamfer as a work piece is guided along the trim slot past the cutting member. The present invention thus provides for a chamfer wherein the cutter tends to pull the work piece into abutment with the horizontal support surface and vertical guide surface while allowing the work piece to be guided past the cutting member without the need of clamping devices.

These and other objects and advantages of the present invention will no doubt become apparent after a reading of the following detailed description of the preferred embodiment which is illustrated in the several figures of the drawing.

DETAILED DESCRIPTION OF THE PREFERRED EMBODIMENT

Figure 1:
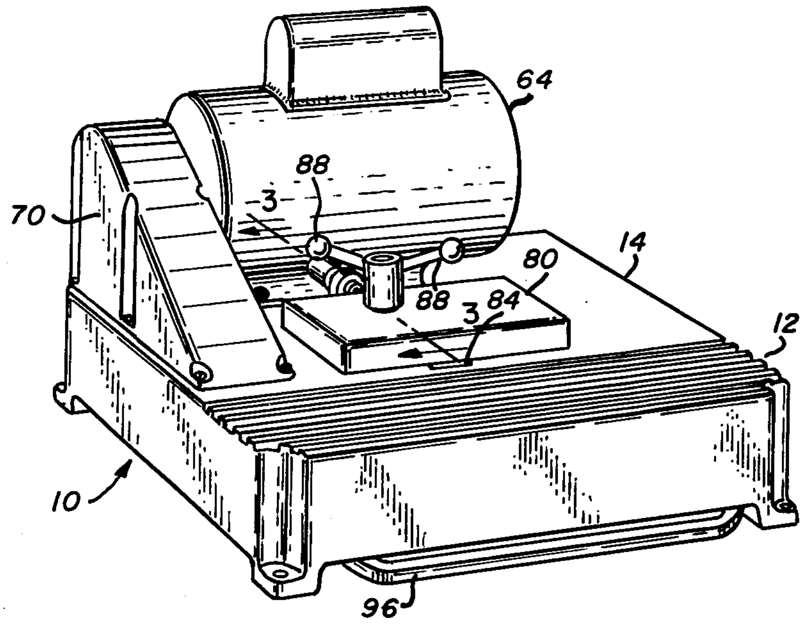
FIG. 1 is a perspective view of the machine according to the present invention.

A corner chamfering machine referred to by the general reference character 10 is illustrated in the various drawings. A casted base member 12 forming a horizontal support surface 14 and with an oblong slot 16 is provided. Mounted within the slot 16 is a circular cutter blade 18 having an axis of rotation 20. The cutter 18 is mounted about the underneath side of the base 12 and is supported by a spindle casting 22 which is positioned and secured about the underneath side of the casting 12 by means of dowels 24 and captive screws 26. A spindle 28 is supported by the spindle casting 22 and secured in position by a means of a bearing of bellville springs 30, a spindle bearing 32, a lock nut bearing 34 and a gear belt pulley bushing 36. A spacer sleeve 38 fits over the spindle 28 intermediate the casting 22 and cutter blade 18. A bearing 40, similar to the bearing 32 abuts to the spacer 38 about the shaft 28 and is secured to a bearing cap 42 which abuts with a shoulder 44 on the shaft 28. The cutter 18 is secured to the shaft 28 by means of a key 46 and a washer 48 and lock nut 50. As mounted in place, the outer periphery of cutter 18 protrudes through the longitudinal slot 16 (see FIG. 3).

A rectangular-shaped slot 60 is formed within the base member 12 such that a gear belt 62 extends therethrough and engaged to the gear belt pulley 36. On the top side of the base 12 is an electric motor 64 having a pulley 66 secured to the drive shaft 68 of the motor. The belt 62 engages the pulley 66 such that the rotation of the electric motor 64 drives the cutting tool 18. A belt quard 70 is positioned over the slot 60 and belt 62 and is secured thereto by means of screws 72.

A guide block 80 having a frontal vertical guide surface 82 is positioned over the arcuate slot 16 such that the vertical plane of the surface 82 intersects with the horizontal plane of the surface 14. A vertical slot 83 is formed in the block 80 to receive the cutter 18. The ends of the wall surfaces 82 and 14 about the slot 16 forms a trim slot 84 through which the outer periphery of the cutter 18 protrudes when positioned within the slot 83 (see FIG. 3). The guide block 80 is held in position by means of a lock mechanism comprising a threaded stud 86 engaged by a quick lock handle 88 which engages the stud 86 to secure the block 80 in place. The position of the block 80 relative to the longitudinal axis of the slot 16 is adjusted by means of a vernier adjustment positioning means comprising a threaded stop block 90 mounted to the surface 14 with an adjustable screw 92 extending therethrough with the terminal end in abuttment with the back side of the block 80. Accordingly, with the handle 88 loosened, the adjustment screw 92 may be adjusted to position the block 80 along the longitudinal axis of the slot 16.

A chip tray 96 is supported about the underneath side of the base member 12 to receive chips as they are released from the cutting tool 18.

Figure 4A:
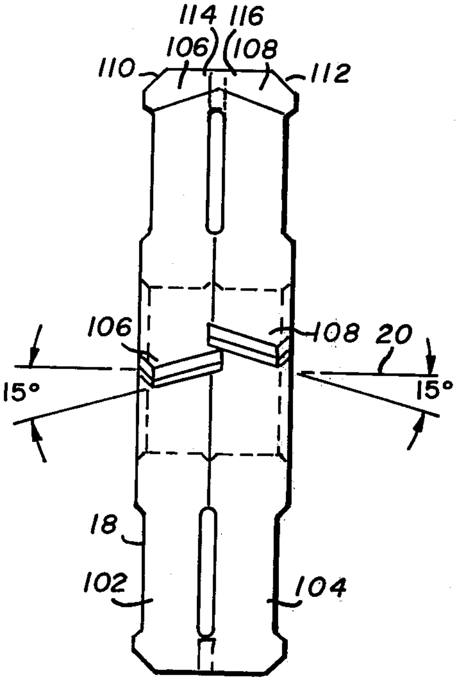
FIGS. 4A and 4B are a partial view and side view of the cutter of the machine of FIG. 1.
Figure 4B:
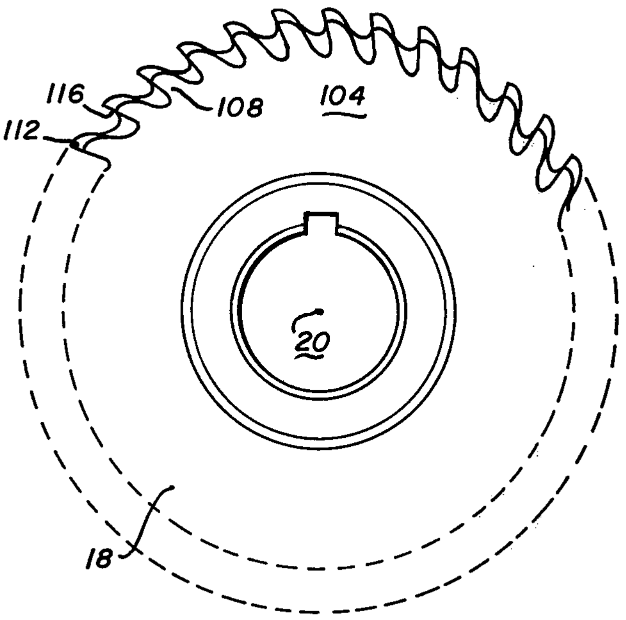

The cutter 18, as illustrated in FIGS. 4A and 4B comprises two interlocking half side mills 102 and 104. The side mill 102 has teeth 106 of which the leading edge is angled to provide a 15° radial rake. The side mill 104 has teeth 108 of which the leading edge is angled to provide a 15° radial rake. The mills 102 and 104 are such that the teeth 106 lead the adjacent teeth 108. Thus, as the cutter 18 is rotated the teeth 106 on the half-side mill 102 commence to cut prior to the cutting action of the adjacent tooth 108 on the half-side mill 104. Each tooth 106 and 108 has a tapered side cutting surface 110 and 112, respectively, of 45° relative to the axis of rotation 20. The teeth 106 and 108 have a horizontal cutting surface 114 and 116, respectively. The adjacent cutting surfaces 114 and 116 overlap.

Figure 3:
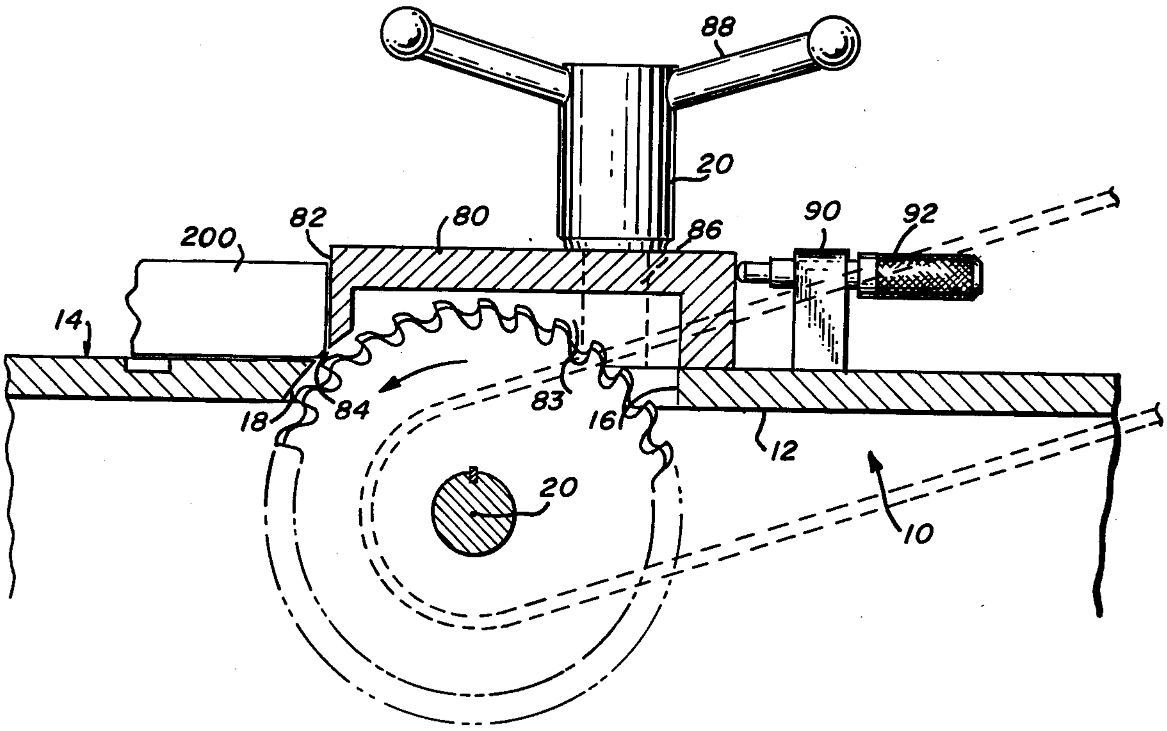
FIG. 3 is a fragmentary sectional view of the machine of FIG. 1.
Figure 2:
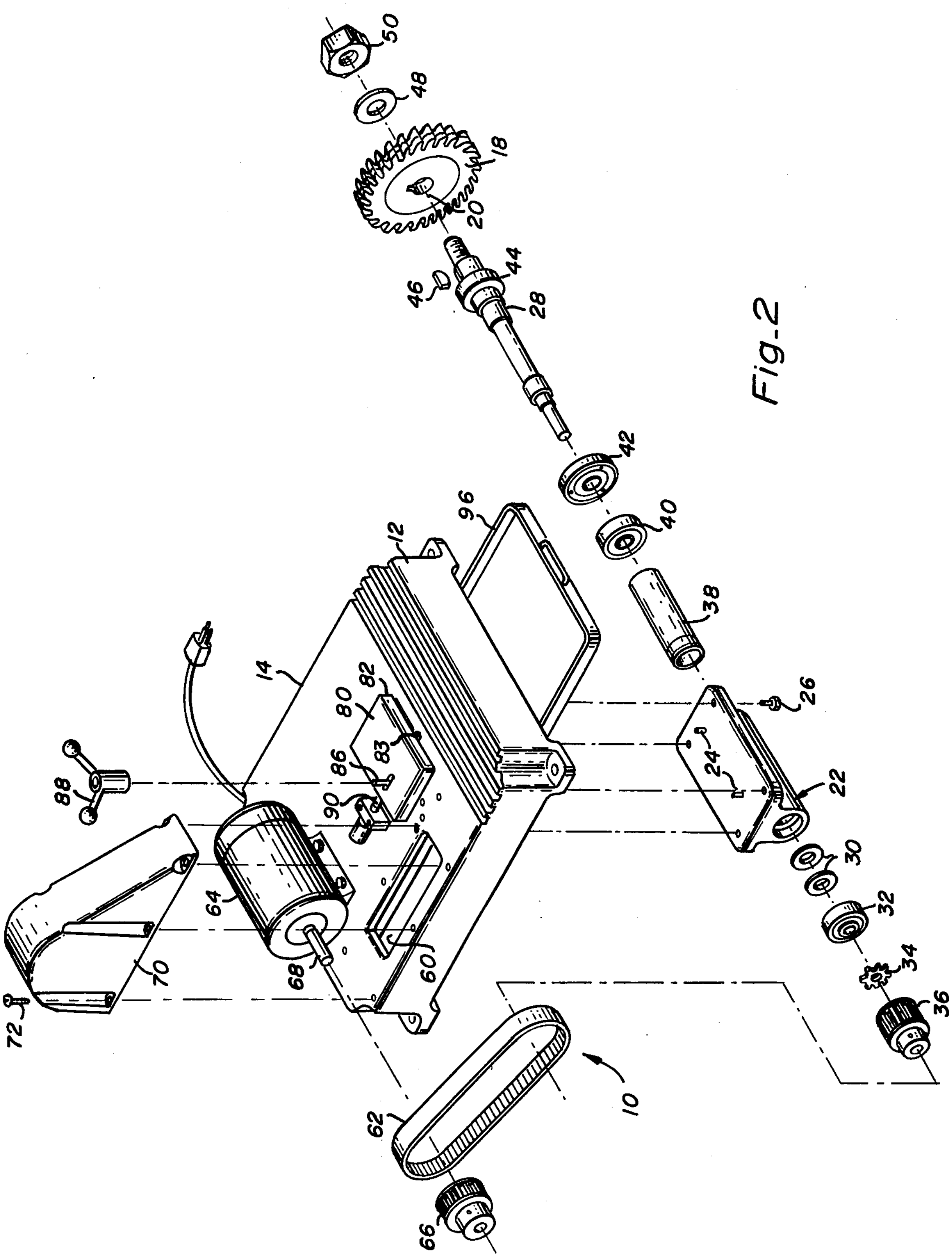
FIG. 2 is an exploded view in perspective of the machine of FIG. 1.

Thus, in operation, a work piece, as illustrated by the block 200 in FIG. 3 may be placed in abutting relationship with the horizontal surface 14 and the vertical surface 82 about the trim slot 84. The work piece may be moved laterally over the edge of the cutting tool 18 by hand feed without the need of clamping it to any member of the machine 10. The cutting tool 18, as it rotates in the counterclockwise direction, has a tendency to pull the work piece 200 into the surfaces 14 and 82 to provide futher safety in retaining the work piece in place. The degree of chamfer may be controlled by controlling the positioning of the block 80 by the adjustment means 92.

The disclosed and described chamfer machine 10 provides a simplified means of machining corner breaks at very high speeds. The capacity of the machine is only limited by the size of the work piece which can be conveniently hand-fit against the guide block 80. Also, the position of the guide block 80 is micro-adjustable to control the chamfer size to very close tolerances. Also, the machine 10 permits an individual to feed a work piece in either lateral direction relative to the cutter 18 and the chips do not fly off of the work piece above the machine but are caught in the chip tray 96 positioned on the underneath side of the surface 14. It is also noteworthy that the work piece can be ferrous, nonferrous, plastic, wood, etc. material and can be of any various shapes including square, rectangular, circular or a combination thereof. The chamfering equipment of the present invention is economical relative to other types of machine tools and would permit a machinist to free-up more expensive equipment.

While, for the sake of clearness and in order to disclose the invention so that the same can be readily understood, specific embodiments have been described and illustrated, it is to be understood that the present invention is not limited to the specific means disclosed. It may be embodied in other ways that will suggest themselves to persons skilled in the art. It is believed that this invention is new and all changes that come within the scope of the following claims are to be considered as part of this invention.

What is claimed is:

1. Chamfering apparatus for use in machining corner breaks of work pieces, comprising:

a base member establishing a horizontal support surface and a longitudinal slot extending through said horizontal support surface;

a guide block mounted on the base member substantially over said longitudinal slot and having a frontal vertical guide surface, the plane of said frontal vertical guide surface being substantially normal to the longitudinal axis of said slot, and at least a portion of said guide block being spaced from said horizontal support surface forming a trim slot about the intersection of the planes of the frontal vertical guide surface and the horizontal support surface;

adjustable positioning means coacting with said guide block for adjusting the vertical spacing between said frontal vertical guide surface and said horizontal support surface and the lateral position of said frontal vertical guide surface along the longitudinal axis of said slot;

a circular cutting member extending through said longitudinal slot and inside a slot provided in said guide block and, mounted about an axis of rotation parallel with the horizontal support surface and said frontal vertical guide surface and with the peripheral cutting surface of said member extending within the trim slot; and power means for driving the cutting member abouts its axis of rotation, whereby a work piece having adjoining walls substantially perpendicular to one another may be urged in abuttment with the frontal vertical guide surface and said horizontal support surface and moved laterally relative to the cutting member to remove material about the intersection of walls of said work piece to form a chamfer.

2. The chamfering apparatus of claim 1 further comprising:

clamping means for securing the guide block relative to the horizontal support surface.

3. The chamfering apparatus of claim 2 further including:

first positional adjustment means for adjusting the elevational position of the guide block relative to the horizontal support surface.

4. The chamfering apparatus of claim 3 further including:

second positional adjustment means for adjusting the lateral position of the guide block relative to the longitudinal axis of said cutting member.

5. The chamfering apparatus of claim 4 wherein, the cutting member is in the form of a blade with a plurality of teeth.

6. The chamfering apparatus of claim 4 wherein the second positional adjustment means includes a stop block supported by the base member and an adjustable screw threaded in said stop block with the axis of said screw normal to the axis of the cutting member, said screw engaging the guide block whereby rotation of said screw causes positional movement of said block laterally relative to the axis of the cutting member.

7. The chamfering apparatus of claim 1 wherein, the circular cutting member is in the form of a pair of half sidemills in abutting relationship each having teeth positioned to form a radial rake with the radial rake of the respective adjacent teeth intersecting each other at an angle less than 180°.

8. The chamfering apparatus of claim 7 wherein, the radial rake of each tooth is approximately 15° relative to the axis of rotation of the cutting member.

9. The chamfering apparatus of claim 8 wherein, each tooth of each half side mill has a tapered side cutting surface.

* * * * *